United States Patent

[11] 3,633,014

[72] Inventors John Lemp, Jr.
Boulder, Colo.;
Howard Clarence Meadors, Jr., Wayside, N.J.

[21] Appl. No. 19,270
[22] Filed Mar. 13, 1970
[45] Patented Jan. 4, 1972

[73] Assignee Bell Telephone Laboratories, Incorporated
Murray Hill, Berkeley Heights, N.J.

[54] DIGITAL EQUALIZER IN WHICH TAP ADJUSTING SIGNALS ARE DERIVED BY MODIFYING THE SIGNAL CODE FORMAT
8 Claims, 7 Drawing Figs.

[52] U.S. Cl. .......... 235/152, 333/18
[51] Int. Cl. .......... G06f 7/00, H04b 3/14
[50] Field of Search .......... 235/152; 333/18; 325/42; 328/162

[56] References Cited

UNITED STATES PATENTS

| | | | |
|---|---|---|---|
| 3,368,168 | 2/1968 | Lucky .......... | 333/18 |
| 3,414,819 | 12/1968 | Lucky .......... | 325/42 |
| 3,414,845 | 12/1968 | Lucky .......... | 333/18 |
| 3,508,153 | 4/1970 | Gerrish et al. .......... | 325/42 |
| 3,508,172 | 4/1970 | Kretzmer et al. .......... | 333/18 |
| 3,537,038 | 10/1970 | Rich .......... | 333/18 |

*Primary Examiner*—Eugene G. Botz
*Assistant Examiner*—David H. Malzahn
*Attorneys*—R. J. Guenther and Kenneth B. Hamlin

ABSTRACT: An all digital multitap transversal filter equalizer system is disclosed in which a received data signal is sampled at a predetermined rate. Each sample of the data signal is converted into a 10-bit serial digital word. The 10-bit word is multiplied by a second digital word successively at each tap to provide data for composite output data words. It has been found that by converting the composite output data word into one's complement format, error magnitude and error polarity signals can be derived for adaptive adjustment without additional equipment.

INVENTORS J. LEMP, JR.
H. C. MEADORS, JR.

BY [signature]
ATTORNEY

DIGITAL EQUALIZER IN WHICH TAP ADJUSTING SIGNALS ARE DERIVED BY MODIFYING THE SIGNAL CODE FORMAT

FIELD OF THE INVENTION

This invention relates to an all digital time domain adaptive equalizer and particularly to an all digital time domain adaptive equalizer in which data is alternately transformed between various coding formats to minimize equipment required to perform each of several functional operations.

BACKGROUND OF THE INVENTION

When digital information is to be sent over a transmission medium, a data signal is generated by varying a voltage between a predetermined number of prescribed levels at known sampling times. For example, a data signal to be transmitted may have two, four, eight, or 16 allowable levels at various sampling times. As the data signal traverses a real transmission medium, it is distorted by effects such as intersymbol interference so that the data signal arriving at the receiver does not contain the prescribed levels or even the predetermined number of levels. The actual amplitude of the received signal is dependent not only on the levels transmitted but also upon the levels transmitted at times prior to and after the time of interest as a function of certain characteristics of the transmission medium.

An equalizer is a device which operates on a received data signal to reconstruct the transmitted data signal. In a self-adjusting equalizer, the actual amplitude of the received signal is measured to provide information about the nature of the distortion introduced by the transmission medium. Self-adjusting time domain equalizer systems, such as adaptive transversal filter equalizer systems, have been built with a combination of analog and digital circuitry. In some self-adjusting transversal filter equalizer systems, an analog delay line is employed to provide time delayed replicas of a received data signal at a plurality of tap locations. These time delay replicas are multiplied in tap multipliers to produce products which are added together to form an equalized output signal.

By maintaining an analog signal, amplitude information indicative of the distortion introduced by the transmission medium can be easily obtained in accordance with a system generally discussed in U.S. Pat. No. 3,414,819 which issued to R. W. Lucky on Dec. 3, 1968, entitled "Digital Adaptive Equalizer System." The error information can then be employed to provide the tap multiplier settings in accordance with a number of well-known algorithms such as the zero forcing system disclosed in the above-mentioned Lucky patent or the mean-square algorithm disclosed in another U.S. Pat. No. 3,375,473 of R. W. Lucky entitled "Automatic Equalizer For Analog Channels Having Means For Comparing Two Test Pulses, One Pulse Traversing the Transmission Channel and Equalizer" issued on Mar. 26, 1968.

The analog circuitry employed in such a system, however, is quite costly in comparison to digital circuitry which can be produced by integrated circuit techniques.

It is possible to digitalize a received data signal and employ an all digital equalizer to correct for transmission medium distortion by constructing a digital transversal filter equalizer which would be a one-to-one substitution of digital functional blocks for corresponding analog functional blocks. It would, of course, be necessary to retain a sufficient number of bits to extract information for self-adjusting algorithms. It has been found that the one-to-one substitution approach leads to a cumbersome and complicated system.

BRIEF DESCRIPTION OF THE INVENTION

In accordance with the teachings of this invention an all-digital self-adjusting time-domain equalizer is provided which alternately transforms information processed thereby between various coding formats to minimize the hardware required to derive error information necessary for self-adjustment.

In one instance, digital numbers representing the amplitude of a received data signal are serially multiplied by digital numbers representing tap coefficients to provide digital numbers representing tap output signals. The numbers being multiplied are kept in the sign-plus-magnitude format. A plurality of tap output signals are digitally combined to provide an equalized output signal as a digital number in the one's complement format.

Error information is extracted from the equalized output signal by merely sensing predetermined bits therein. One bit of the equalized output signal is utilized as the sign of the error signal while a plurality of bits serve as the magnitude thereof. Therefore, it is seen that the error signal thus derived is easily transformed back to the sign-plus-magnitude format to facilitate further multiplications. If the sign-plus-magnitude format had been maintained through to the equalized output signal, complicated arithmetic computations would have been required to derive the error sign and magnitude information.

DESCRIPTION OF THE DRAWING

FIGS. 1 and 2 are connected together to form a system embodying the principles of this invention;

DETAILED DESCRIPTION

Figure 1:
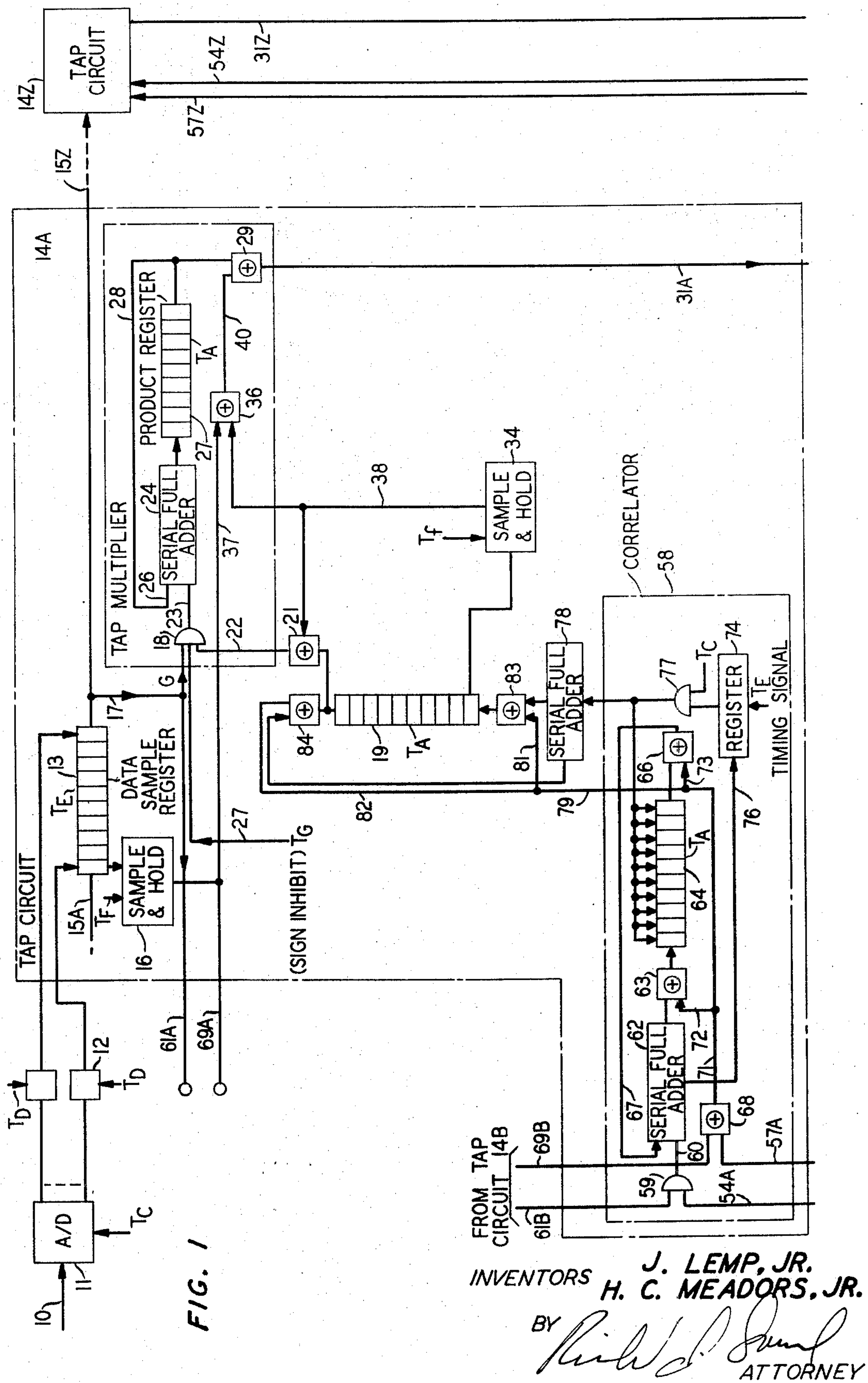
FIG. 1 is a block diagram of part of a system constructed in accordance with the teachings of this invention.
Figures 2, 3:
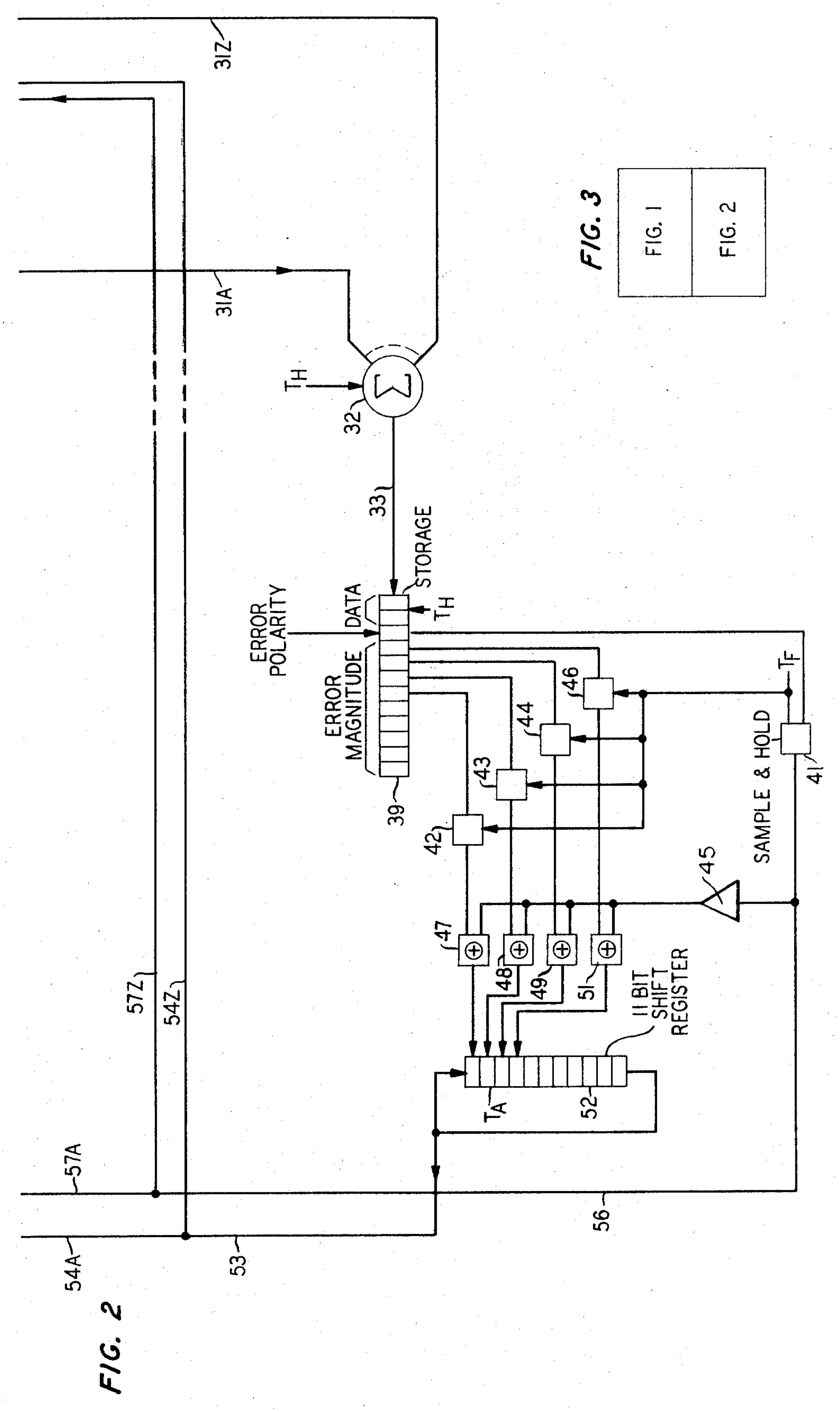
FIG. 2 is a block diagram of the remainder of the system partially disclosed in FIG. 1.
FIG. 3 is a diagram showing how
Figure 7:
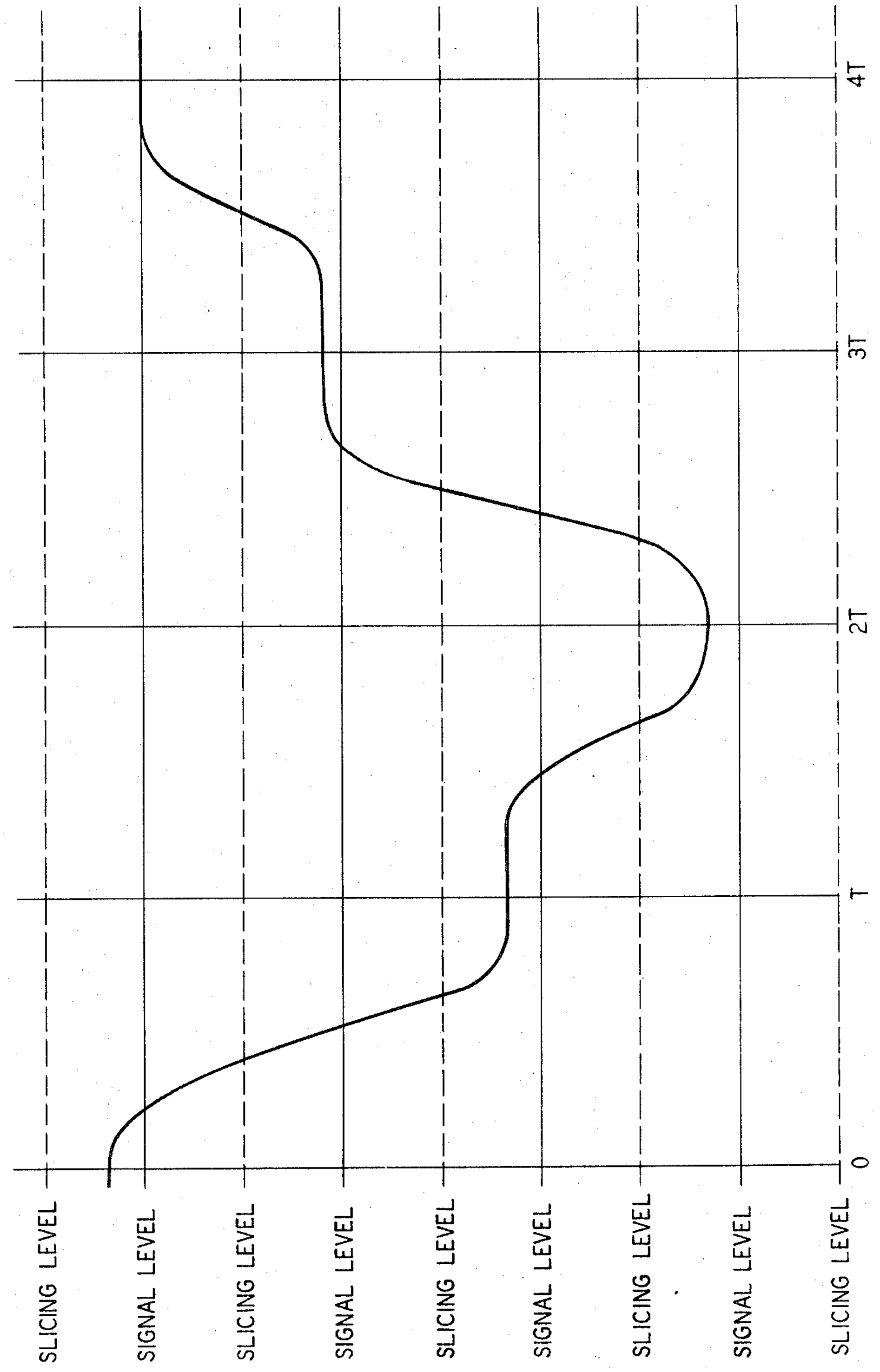
FIG. 7 is a waveform diagram showing a multilevel data signal to be equalized by a system embodying the principles of this invention.

FIGS. 1 and 2 taken together as shown in FIG. 3 show an all digital mean-square time-domain equalizer which receives a four-level data signal, see FIG. 7, having a data rate of 1/T bits per second on an input lead 10. The four-level data signal was extracted from a modulated signal which was transmitted over a signal distorting transmission medium along with a pair of pilot tones.

An analog-to-digital converter 11 in FIG. 1 encodes the received signal into a 10-bit digital word in the sign-plus-magnitude format. The two most significant bits in the 10-bit digital word represent primarily the information contained in the four-level data signal while the remaining bits contain information relating primarily to the nature of the medium over which the data signal was transmitted.

Figure 4:
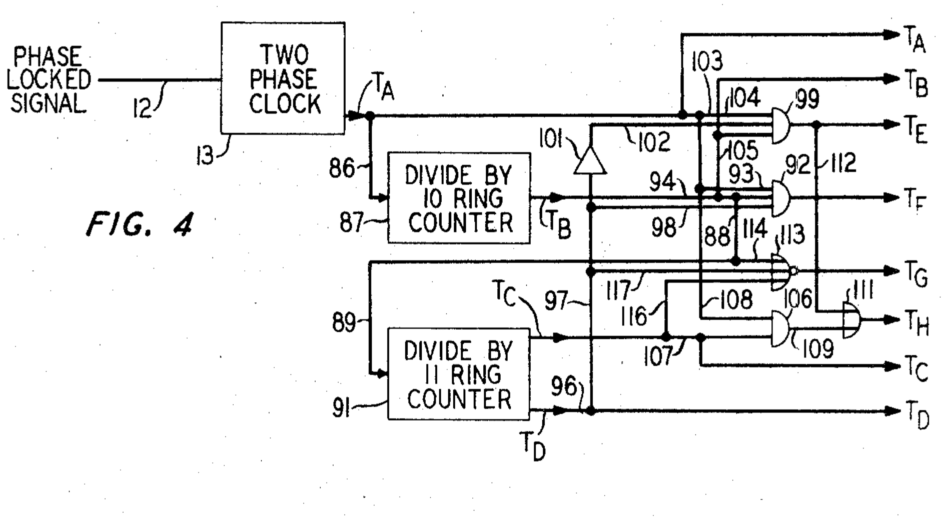
FIG. 4 is a block diagram of a system for generating timing waveforms to synchronize the system shown in FIG. 3.
Figure 5:
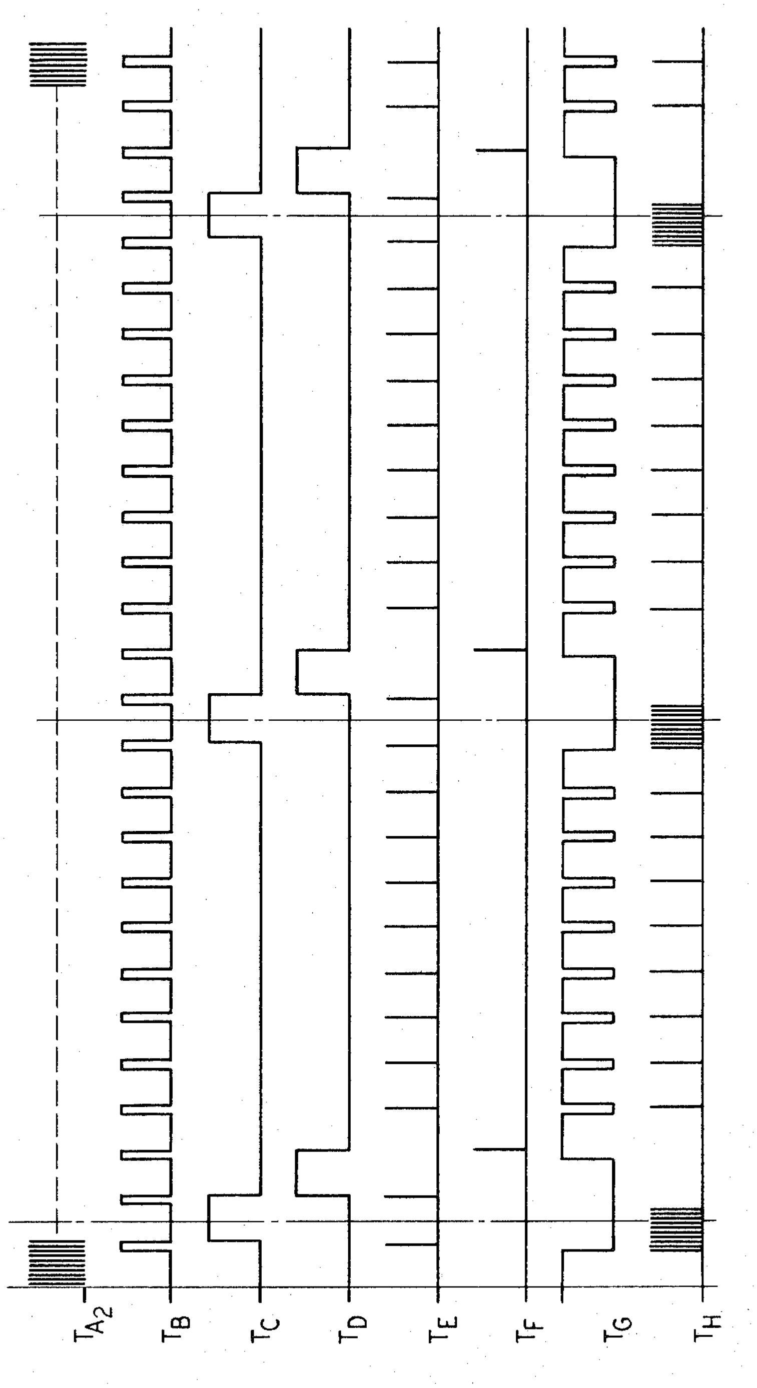
FIG. 5 is a waveform diagram showing some of the timing waveforms provided by the system of FIG. 4.

A different 10-bit word is generated once every T seconds as a timing phase determined by a sampling pulse $T_c$, see FIG. 5 The sampling pulse $T_C$ is generated by a system shown in FIG. 4 in response to the pair of pilot tones. In this particular embodiment the difference between the pair of pilot tones of 110 times the data rate (i.e., 110 divided by T cycles per second).

At a time $T_D$ the 10-bit word in the analog-to-digital converter 11 is transferred by a plurality of gates 12 into a data sample register 13. The 10-bit word is inserted in the register 13 with its sign bit in the leftmost stage and the least significant bit in the rightmost stage. The data sample register 13 is part of a first tap circuit 14A. In FIG. 1 only the first tap circuit 14A and a last tap circuit 14Z are shown for ease of explanation. In practice many more identical tap circuits would be employed. For example, a typical equalizer may have 23 taps.

The timing signal $T_E$ clocks 10-bit data words out of each register in the respective tap circuits 14A through 14Z such as register 13, bit by bit, into a corresponding register in a succeeding tap circuit.

As the 10-bit data word is shifted out of the data sample register 13 by the timing signal $T_E$, it is also applied by a lead 17 to an AND-gate 18. The AND-gate 18 together with a serial full adder 24 and a product shift register 27 form a serial multiplication circuit. A tap multiplication factor stored as a simple binary number in a 10-stage shift register 19 is passed through an exclusive-OR-circuit 21 and applied by a lead 22 as a second input to the AND-gate 18. The data stored in the shift register 19 is advanced by timing pulse $T_A$ which provides 10 shifting pulses for every shifting pulse applied to the data sample register 13.

The AND-gate 18 performs a simple bit-by-bit multiplication of the digits stored in the data sample register 13 and the digit stored in the register 19. A serial stream of data representing this bit-by-bit product is provided by the AND-gate 18 on a lead 23 to the serial full adder 24.

The serial full adder adds with a carry capability the data on the lead 23 with a digital bit stream appearing on an input terminal 26 thereof to provide a bit stream to the nine-stage product shift register 27. The last stage of the product shift register 27 is tied back by a lead 28 to the input terminal 26 of the serial full adder 24. A clocking signal $T_G$, see FIG. 5, is applied to the AND-gate 18 to bring the output thereof to "0" every time the sign indicative bit from the register 19 is presented at the input of the AND-gate 18 and for the entire period when the sign indicative bit from the data sample register 13 is presented as an input to the AND-gate 18.

The output from the product shift register 27 is applied by an exclusive-OR-circuit 29 and a lead 31A to an adder circuit 32, see FIG. 2. Similar outputs from each of the other tap circuits, for example, on lead 31Z from tap circuit 14Z are also applied to the adding circuit 32. A timing pulse $T_H$, shown in FIG. 5, enables the adder 32 to provide a sum when valid terms for the final product are provided by the various tap multiplier circuits 14A through 14Z on a lead 33. For a thorough discussion of serial multiplication see pp. 150–155 of Arithmetic Operations in Digital Computers, by R. K. Richards, copyright 1955 by D. Van Nostrand Co., Inc.

It should be clear that the total product from each of the tap circuits 14A through 14Z is never formed simultaneously. The summation of terms in the products is performed by the adder circuit 32 before the tap circuits 14A through 14Z have completed the multiplication process. In this way no additional time is required to perform the addition because the addition is performed as soon as the final terms in the products are formed.

A look at the signal $T_E$ in FIG. 5 shows that a complete 10-bit data word will have been transferred into each of the registers in the tap circuits 14A through 14Z at the time when the timing pulse $T_F$ occurs. This timing pulse $T_F$ is therefore employed to operate a sample and hold circuit 16 to store the sign bit information of the 10-bit data word in the data sample registers such as data sample register 13.

At the same time $T_F$ the first bit from the register 19 is read by a sample and hold circuit 34. The outputs from the sample and hold circuits 16 and 34 are applied to an exclusive-OR-circuit 36 by leads 37 and 38, respectively. Since the sample and hold circuits 16 and 34 are updated by the timing pulse $T_F$, the output from the exclusive-OR-circuit 36 will not change during the interval while one 10-bit data word from the sample register 13 is multiplied by a factor stored in the register 19. The output from the exclusive-OR-circuit 36 is indicative of the sign of the product provided by the serial multiplier circuit formed by AND-gate 18, serial full adder 24, and product shift register 27.

The sign indicative signal on the output of exclusive-OR-circuit 36 is applied by a lead 40 to the exclusive-OR-circuit 29. In this way the product signal provided by the product shift register 27 to the exclusive-OR-circuit 29 is converted to the one's-complement format. In the one's-complement format, positive numbers increase in magnitude from all "0's" representing a number slightly greater than zero, while negative numbers decrease in magnitude from all "1's" representing a number slightly less than zero. This format is advantageous for addition because no sign bit need be employed to control the adder circuit. See Digital Computer Fundamentals by Thomas C. Bartee, pp. 44—51 published by McGraw Hill in 1960 for a discussion of the one's-complement format.

Converting the signal at this point to the one's-complement format has an added advantage in an adaptive time-domain equalizer system because error polarity and error magnitude signals employed to generate the multiplication factor stored in the register 19 can be extracted therefrom without additional arithmetic operations.

Figure 6:
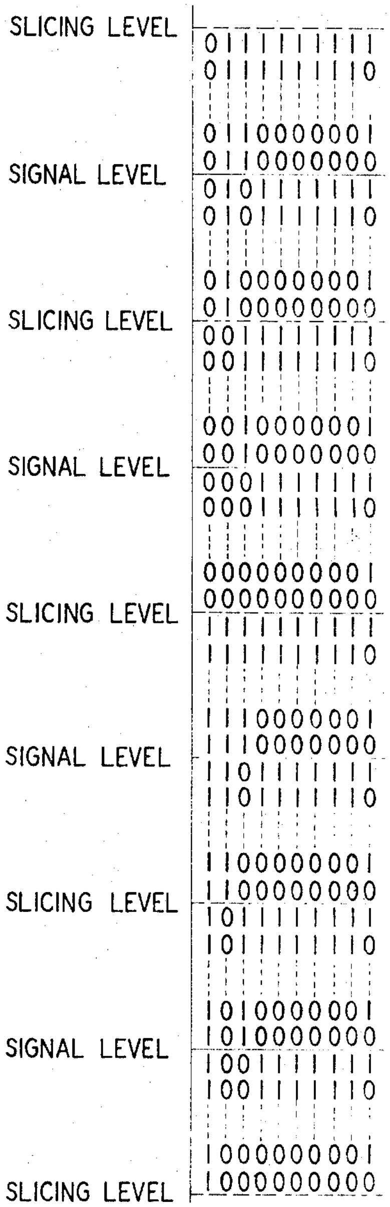
FIG. 6 is a diagram graphically showing numbers in the one's complement format which represent various significant levels in a multilevel data signal equalized by a system embodying the principles of this invention.

The chart in FIG. 6 shows the binary numbers in the one's-complement format representing signal levels immediately above and below both nominal signal levels of the received data signal and nominal slicing levels of the received data signal. While the term slicing level has no physical significance in the all-digital time-domain equalizer of this invention, it has become a term of art in the time-domain equalizer art meaning a level above which a signal is said to have a first digital value while a signal below would be considered to have a second digital value.

In FIG. 6, the actual signal levels are represented by solid lines while the slicing levels are represented by dashed lines. A digital number which falls between two sets of any two consecutive dashed lines is considered to have the same information content. For example, all the numbers between the two lowest sets of dashed lines in FIG. 6 have "10" as their first two bits from the left. These are the information bearing bits for a four-level system.

In such a system, it is of particular interest to note that with the one's-complement format, the third bit changes value when it crosses either a slicing level or a signal level. When a number is more positive than its nearest signal level, the third bit is always a "1"; when a number is more negative than its nearest signal level, its third bit is always a "0". This property of the one's-complement format enables one to obtain the polarity of the difference between a number representing an actual digital signal and a predetermined signal level by merely sensing the value of the bit after the last bit necessary to obtain the transmitted information. Going back to our example we see that numbers between the lowest slicing level and the lowest signal level in FIG. 6 have a "0" as their third bit while those numbers between the lowest signal level and the next slicing level have a "1" as their third bit.

This holds true when any number of levels is transmitted so long as that number is a power of two. When an eight-level signal is transmitted, three bits would represent information while the fourth bit would be the error polarity bit.

It should further be noted in FIG. 6 that all the bits starting with the fourth bit are indicative of the magnitude of the deviation of the actual number from the signal level. Numbers which are more positive than their nearest signal level increase from "0" while those more negative than the nearest slicing level decrease from all "1's". Therefore, by merely using those less significant bits associated with a "1" for the sign bit and inverting those less significant bits associated with a "0" for the sign bit, one can simply extract a signal indicative of the error between an actual number and a prescribed signal level in the sign-plus-magnitude format. This is accomplished by using the third bit as the sign bit and the remaining less significant bits as the magnitude bits so long as one inverts those magnitude bits associated with a "0" sign bit.

To recover the information transmitted and the sign and magnitude of the deviation of the actual signal on lead 10 from the ideal, the bits provided on the lead 33 in response to the timing signal $T_H$ are shifted into a shift register 39. At the time indicated by the timing pulse $T_F$, all the bits from the adder 32 have been shifted into the shift register 39, therefore, a sample and hold circuit 41 is activated by the timing signal $T_F$ to sense the state of the third stage from the right in the shift register 39. It should be remembered that the transmitted signal received on the lead 10 was a four-level signal, therefore, the first two bits from the right in the shift register 39 indicate the information transmitted. As previously discussed, the third bit read by the sample and hold circuit 41 contains the sign of the error signal. The remaining bits in the shift register are error magnitude bits.

In this embodiment, only four error magnitude bits are employed in future computations, therefore, four gates 42 through 44 and 46 are energized by the timing signal $T_F$ to read out the four most significant error magnitude bits. The output from the gates 42 through 44 and 46 are each applied to an exclusive-OR-circuit 47 through 49 and 51 along with the output from the sample and hold circuit after inversion in inverter 45. In this way, the error magnitude is merely transmitted if the sign of the error is positive while the error magnitude bits are inverted for a negative error.

The outputs of the four exclusive-OR-circuits 47 through 49 and 51 are applied to four stages of an 11-bit recirculating shift register 52. The 11-bit shift register 52 is advanced by the timing signal $T_A$ so that for each occurrence of the timing signal $T_E$, the information in the shift register 52 has shifted one bit position. The output from the shift register 52 is applied by a lead 53 and leads 54A through 54Z to each of the tap circuits 14A through 14Z to provide error magnitude information. In a like manner, the output of the sample and hold circuit 41 is applied by a lead 56 and 57A through 57Z to each of the tap circuits 14A through 14Z as error polarity or sign information.

Looking again to FIG. 1, we see that the error magnitude and error polarity signals on the leads 54A and 57A are applied to a correlator 58 which in accordance with the mean-square tap-setting algorithm multiples the error signal by each tap signal and averages the product. Since the tap signal has advanced one tap by the time the error signal is computed, the tap signal from the next succeeding tap is employed in each correlator rather than the present tap signal.

This is accomplished by applying the error magnitude signal on the lead 54A to an AND-gate 59 and the tap signal from the next succeeding tap circuit 14B, not shown, to the AND-gate 59 by means of a lead 61B. As with the AND-gate 18, the AND-gate 59 provides a bit-by-bit multiplication of the data streams applied thereto. The tap signal applied by the lead 61B is advanced by the timing signal $T_E$. The error magnitude signal applied by the lead 54A is advanced by the timing signal $T_A$, therefore, one would expect the signal on the lead 54A to advance one complete cycle each time the signal on the lead 61B changes. This is not true, however, since the error magnitude signal is being recirculated in the 11-bit shift register 52 which provides a signal which advances one bit position each time the tap signal on lead 61B changes. This advancing of one bit position by the error magnitude signal enables the direct addition of partial products provided by the AND-gate 59 each time the tap signal is changed without further shifting operations.

Therefore, the output from the AND-gate 59 is applied by a lead 60 to a serial full adder 62 which has a carry capability. The output from the serial full adder 62 is passed by an exclusive-OR-circuit 63 to a 10-stage shift register 64. The output from the shift register 64 is passed through an exclusive-OR-circuit 66 and recirculated back to a second input of the serial shift register 62 by a lead 67.

It should be noted that the shift register 27 in the tap multiplier includes nine stages to provide shifting of one bit position to carry out the multiplication process. Since the 11-bit shift register 52 provides the shifting before the signal is applied to the serial full adder 62, a 10-bit shift register 64 is employed. These two techniques are essentially equivalent for performing the shifting of partial products before addition necessary for serial arithmetic.

The error polarity signal on the lead 57A is applied to an exclusive-OR-circuit 68. The sign signal from the tap circuit 14B stored in a sample and hold circuit 16B, not shown, is applied by a lead 69B as a second input to the exclusive-OR-circuit 68.

The output from the exclusive-OR-circuit 68 provided on a lead 71 is indicative of the sign of the product of the error signal times the tap signal. This signal on the lead 71 is applied by leads 72 and 73 to the exclusive-OR-circuits 63 and 66, respectively. In this way, it is seen that a digital signal recirculating from the shift register 64 through the exclusive-OR-circuit 66, lead 67, serial full adder 62 and back through exclusive-OR-circuit 63 to the shift register 64 is either inverted twice by the exclusive-OR-circuits 63 and 66 or not inverted at all. During any one multiplication (i.e., cycle of the data sample register 13) the signal applied by the leads 71, 72, and 73 to the exclusive-OR-circuits 63 and 66 remains constant. The shift register 64, therefore, with its associated circuitry functions as an averaging circuit or correlator. If a positive product is being accumulated, one signal is applied to the exclusive-OR-circuits 63 and 66 while when a negative product is being accumulated, a second signal is applied to the exclusive-OR-circuits 63 and 66 so that the number in the shift register 64 and 66 is either increased or decreased in accordance with the sign signal applied by the leads 71, 72, and 73 to the exclusive-OR-circuits 63 and 66.

After each partial product is added to the information stored in shift register 64, the timing signal $T_E$ enables a sampling register 74 to sense a signal on a lead 76. The signal on the lead 76 indicates whether or not the serial full adder 62 contains a carry bit. If the carry bit is present in the serial full adder 62 at the end of the addition of a partial product, it is apparent that the register 64 has overflowed which means that the number being stored in the register 64 exceeds a predetermined value in either a positive or negative direction.

The timing pulse $T_C$ enables a gate 77 to pass the information stored in the register 74 to a serial full adder 78. The serial full adder 78 adds the signal supplied by the gate 77 to the recirculating information contained in the register 19. The information in the register 19 is either increased in a positive or negative direction by the signal applied by the gate 77 in accordance with the sign signal provided from the exclusive-OR-gate 68 by leads 78, 79, 81, and 82 to a pair of exclusive-OR-gates 83 and 84. The exclusive-OR-gates 83 and 84 are connected to the register 19 in a way analogous to the connection of the exclusive-OR-gates 63 and 66 to the register 64.

A look at the timing diagram in FIG. 5 shows that since the timing pulse $T_C$ occurs before the timing pulse $T_F$, the sign information provided to the exclusive-OR-circuits 83 and 84 will indeed be indicative of the direction in which the serial full adder 62 has overflowed. When the serial full adder 62 has not overflowed, the gate 77 provides a "0" to the serial full adder 78 which does not affect the information contained in the register 19. The output from the gate 77 is also employed to reset the register 74 and the shift register 64 to a predetermined value, typically, one-half way in its count plus the signal value of the overflow.

For an understanding of how the timing signals shown in FIG. 5 are derived, a brief look at FIG. 4 is necessary. The clock 13 phase locked to the received signal provides the timing signal $T_A$. The timing signal $T_A$ is applied by a lead 86 to a divide-by-10 ring counter 87 which provides the timing signal $T_B$. The timing Signal $T_B$ is applied by leads 88 and 89 to an 11-stage ring counter 91 which provides the timing signals $T_C$ and $T_C$ each of which occurs once for each 11 pulses in the signal $T_B$. The timing pulse $T_F$ is provided by an AND-gate 92 in response to the simultaneous presence of the timing signal $T_A$ provided by a lead 93, the timing signal $T_B$ provided by a lead 94 and the timing signal $T_D$ provided by leads 96, 97, and 98.

Since the timing signal $T_E$ is the complement of the timing signal $T_F$, it is derived by applying the same timing signals to the AND-gate 99 which were applied to AND-gate 92 with the exception that the timing signal $T_D$ is inverted by an inverter 101 and applied to the AND-gate 99 by a lead 102. The timing signal $T_A$ is applied to the AND-gate 99 by leads 103 and 104 while the timing signal $T_B$ is applied by a lead 105.

The timing signal $T_H$ is generated upon the occurrence of either both the timing signals $T_C$ and $T_A$ or the timing signal $T_E$. This is accomplished by applying the timing signal $T_C$ to an AND-gate 106 by means of a lead 107 and the timing signal $T_A$ to the AND-gate 106 through a lead 108. The output from the AND-gate 106 is applied by a lead 109 to an OR-gate 111 while the timing signal $T_E$ is also applied to the OR-gate 111 by a lead 112.

The timing signal $T_G$ is generated by an OR-gate 113 in response to the timing signals $T_B$, $T_C$, and $T_D$. The timing signal $T_B$ is applied to the OR-gate 113 by leads 88 and 114 while the timing signal $T_C$ is applied to the OR-gate 113 by the leads 107 and 116. The timing signal $T_G$ is applied to the OR-gate 113 by the lead 96 and a lead 117.

It should be understood that various other embodiments and modifications can be made by those skilled in the art without departing from the spirit and scope of the invention.

What is claimed is:

1. In combination:
means responsive to a received quantized signal for providing a first multibit data signal having a sign indicative bit and magnitude indicative bits;
means responsive to error signals applied thereto for providing a second multibit data signal having a sign indicative bit and magnitude indicative bits;
a digital multiplier for multiplying said magnitude indicative bits of said first and second multibit data signals for providing a third multibit data signal;
means responsive to an exclusive-OR combination of said sign indicative bit of said first multibit data signal and said sign indicative bit of said second multibit data signal for algebraically operating on said third multibit data signal to provide a fourth multibit data signal; and
means for applying one bit of said fourth multibit data signal as an error polarity signal to said second multibit data signal providing means.

2. The combination as defined in claim 1 in which:
said received quantized signal has $2^N$ significant information levels, where $N$ is any positive integer;
said first multibit data signal contains $(N + M)$ bits, where $M$ is any positive integer;
said one bit of said fourth multibit data signal constituting said error polarity signal is the $(N+1)^{st}$ most significant, and
said $(N + 2)^{nd}$ most significant bit and remaining bits of lesser significance together define error magnitude.

3. The combination as defined in claim 2 in which said second multibit data signal providing means includes:
means responsive to the long-term average of the exclusive-OR combination of said $(N+1)^{st}$ most significant bit and said sign indicative bit of said first multibit data signal for altering said second multibit data signal.

4. The combination defined in claim 2 in which said second multibit data signal providing means includes:
means responsive to said bits in said fourth multibit data signal defining error magnitude and said signal magnitude indicative bits of said first multibit data signal for providing product bits;
means for storing the sum of said product bits and bits applied thereto;
means for providing an increment signal when said bits in said storing means represent a value greater than a predetermined value; and
means responsive to said increment signal for altering said second multibit data signal in accordance with the exclusive-OR combination of said $(N+1)^{st}$ most significant bit of said fourth multibit data signal and said sign indicative bit of said first multibit data signal.

5. The combination as defined in claim 1 also including:
means for supplying a fifth multibit data signal; and
said means for algebraically operating on said third multibit data signal includes:
means for algebraically combining said fifth multibit data signal with said third multibit data signal thereby providing said fourth multibit data signal.

6. The combination as defined in claim 5 also including:
a multistage shift register for storing said fourth multibit data signal.

7. The combination as defined in claim 6 also including:
a sample and hold circuit for sampling and storing the bit representing error polarity from one stage of said multibit shift register;
means for connecting said sample and hold circuit to said second multibit data signal providing means thereby applying a signal thereto.

8. The combination as defined in claim 1 in which said digital multiplier is a serial multiplier including:
a AND-gate responsive to said magnitude indicative bits of said first and second multibit data signals for providing a partial product signal;
a serial full adder for adding signals applied thereto to provide a sum signal;
means for applying said partial product signal to said serial full adder;
a shift register having an input and an output for recording said sum signal at said output and providing a delayed replica signal thereof at said output; and
means for applying said delayed replica signal to said serial full adder.

* * * * *